(12) United States Patent
Eriksson et al.

(10) Patent No.: US 7,837,270 B2
(45) Date of Patent: Nov. 23, 2010

(54) VEHICLE SEAT HAVING A VENTILATION SYSTEM

(75) Inventors: Harry Eriksson, Trollhättan (SE); Christer Andersson, Trollhättan (SE); Bengt Andreasson, Trollhättan (SE); Torbjörn Andersson, Trollhättan (SE)

(73) Assignee: Lear Corporation, Southfield, MI (US)

( * ) Notice: Subject to any disclaimer, the term of this patent is extended or adjusted under 35 U.S.C. 154(b) by 201 days.

(21) Appl. No.: 11/096,199

(22) Filed: Mar. 31, 2005

(65) Prior Publication Data

US 2005/0269859 A1 Dec. 8, 2005

(30) Foreign Application Priority Data

Mar. 31, 2004 (DE) .................. 20 2004 005 116 U

(51) Int. Cl.
*A47C 7/02* (2006.01)
*A47C 7/74* (2006.01)

(52) U.S. Cl. ............................. 297/452.47; 297/452.46; 297/180.14

(58) Field of Classification Search ............ 297/180.13, 297/180.14, 452.47, 452.56, 180.1, 452.46
See application file for complete search history.

(56) References Cited

U.S. PATENT DOCUMENTS

| | | | | |
|---|---|---|---|---|
| 3,000,020 A | * | 9/1961 | Lombard et al. ................. | 5/653 |
| 4,043,544 A | * | 8/1977 | Ismer ........................... | 267/83 |
| 4,853,992 A | * | 8/1989 | Yu ................................ | 5/423 |
| 4,946,220 A | * | 8/1990 | Wyon et al. ............. | 297/180.13 |
| 5,016,302 A | * | 5/1991 | Yu ................................ | 5/423 |
| 5,597,200 A | * | 1/1997 | Gregory et al. ......... | 297/180.13 |
| 5,927,817 A | * | 7/1999 | Ekman et al. .......... | 297/452.47 |
| 6,003,950 A | * | 12/1999 | Larsson .................. | 297/452.42 |
| 6,062,641 A | * | 5/2000 | Suzuki et al. ............. | 297/180.1 |
| 6,068,332 A | * | 5/2000 | Faust et al. ............ | 297/180.13 |
| 6,145,925 A | * | 11/2000 | Eksin et al. ............. | 297/180.14 |
| 6,179,706 B1 | * | 1/2001 | Yoshinori et al. ........... | 454/120 |
| 6,189,966 B1 | * | 2/2001 | Faust et al. ............ | 297/180.14 |
| 6,206,465 B1 | * | 3/2001 | Faust et al. ............ | 297/180.14 |
| 6,224,150 B1 | * | 5/2001 | Eksin et al. .............. | 297/180.1 |
| 6,291,803 B1 | * | 9/2001 | Fourrey ...................... | 219/497 |
| 6,511,125 B1 | * | 1/2003 | Gendron ................ | 297/180.11 |
| 6,578,910 B2 | | 6/2003 | Andersson et al. | |
| 6,685,553 B2 | * | 2/2004 | Aoki ........................... | 454/120 |
| 6,786,541 B2 | | 9/2004 | Haupt et al. | |
| 6,817,675 B2 | * | 11/2004 | Buss et al. ................ | 297/452.6 |
| 7,108,319 B2 | * | 9/2006 | Hartwich et al. ......... | 297/180.1 |
| 2002/0140258 A1 | * | 10/2002 | Ekern et al. ............ | 297/180.14 |
| 2005/0082885 A1 | * | 4/2005 | Thunissen et al. ........ | 297/180.1 |
| 2006/0138811 A1 | * | 6/2006 | Pfahler et al. .......... | 297/180.14 |

FOREIGN PATENT DOCUMENTS

| | | |
|---|---|---|
| DE | 101 44 839 A1 | 3/2003 |
| FR | 2 686 299 A1 | 7/1993 |
| WO | WO-0105623 A1 * | 1/2001 |
| WO | WO 02/053400 A2 | 7/2002 |

* cited by examiner

*Primary Examiner*—David Dunn
*Assistant Examiner*—Tania Abraham
(74) *Attorney, Agent, or Firm*—Brooks Kushman P.C.

(57) ABSTRACT

A vehicle seat for use with a ventilation system is provided. The seat includes an air-conducting layer, which may be provided underneath a seat surface. The air-conducting layer may cooperate with intake spots in a seat portion. The intake spots may be placed on lines substantially corresponding to the position of the legs of a person sitting in the seat and/or on a line extending substantially along the spine of a person sitting in the seat.

18 Claims, 3 Drawing Sheets

VEHICLE SEAT HAVING A VENTILATION SYSTEM

BACKGROUND OF THE INVENTION

1. Field of the Invention

The present invention relates to a vehicle seat having a ventilation system according to the preamble of claim 1.

2. Background Art

A generic vehicle seat is known from U.S. Pat. No. 6,578, 910 B2. The seat described in this document can be pre-cooled—for example, if the vehicle is strongly overheated in summer—before a passenger sits down on the seat. To this end, a ventilation system is activated, e.g. by means of a remote control, which system sucks off heated air from a surface layer of the seat and allows a cooler airflow to follow.

With respect to a vehicle seat it must be noted, however, that not only the seat is to be pre-cooled before the passenger sits down on the seat. It is rather also decisive that the ventilation system is able to effectively cool the passenger after he has sat, down on the seat. In conventional vehicles having a cooling system the cooling of the passenger is many times unsatisfying. Frequently so-called "cold spots" occur during the cooling, at which the passenger is cooled too strongly. This is an unpleasant feeling for him so that he turns off the cooling before an effective cooling has started.

SUMMARY OF THE INVENTION

It is the object of the present invention to improve the known vehicle seat with means as simple as possible from a constructive point of view; allowing a more effective cooling of the surfaces of the seat and the back rest.

This object is provided by a vehicle seat comprising the features of claim 1.

According to the invention the intake spots between the air-conducting layer and the vent channels are distributed on those lines on which there is a contact between the passenger and the seat. In the back part of the seat this contact line is approximately positioned along the spine of the passenger, whereas the contact lines on the lower part of the seat are defined by the position of the passenger's legs.

The arrangement of the intake spots according to the invention effects a very good cooling of the surfaces of the seat and the back rest. The explanation for this resides in that a flat airflow is brought near the contact line from both sides before the air is sucked off through the vent channels below the contact line. Via this large-surface airflow not only a large amount of heat can be transported, but the airflow of the inventive vehicle seat takes place underneath the entire contact surface between the seat and the body part located on top thereof.

According to the invention the seat surface of the lower part of the seat and of the back part of the seat is made of an impervious material which prevents the undesired air admission from outside through the material at least in the area of the seat or the back rest surface. This material may be perforated in desired admission areas, e.g. at the edges or at the underside of the seat or at the outside of the back rest, respectively. In the surface of the seat and the back rest it should form a possibly airproof parting plane, however, so as to force the air admission to take place at the marginal areas of the surfaces of the seat.

The wide and flat airflow takes place underneath the seat surface, in the area of the air-conducting layer. The intake spots arranged in lines do not effect an air suction at certain points, but—in connection with the air-conducting layer arranged below the seat surface—serve the interior body of the seat and the back rest to be flushed through as uniform and, above all, as flat as possible. As the air-conducting layer is arranged directly underneath the seat surface a good cooling effect for the seat surface itself is obtained and, thus, for a person sitting on the seat.

In the simplest form from a constructive point of view the lines, on which the intake spots are arranged, may be formed as straight lines.

With respect to the adaptation to the usual sitting position of the passenger in the vehicle it is an advantage if the lines, on which the intake spots are arranged, diverge in a forward direction in the lower part of the seat.

The air-conducting layer can, for example, be hollow, wherein a surface layer above this hollow layer would then only be supported on individual spots. The air-conducting layer is preferably made of an air-permeable material, however, e.g. a textile material. This facilitates the assembly of the seat and increases the stability thereof.

It is moreover favorable if the air-conducting layer is made of a non-compressible or only slightly compressible material. In this way it may maintain its air-conducting properties also when being weighted by the passenger. A slightly compressible layer therefore ensures an efficient cooling also, and especially then, when a passenger sits on the seat.

The air-conducting layer is preferably provided on substantially the entire surface of the lower part of the seat and/or the back part of the seat. This offers the advantage that a cooling may be effected over the entire seat surface.

According to a modification of the invention perforations are provided in the seat surface, especially at the sides of the seat surface, as to allow an admission of air into the air-conducting layer. By this cooler air can be sucked in through the seat surface.

According to another modification the air-conducting layer is at least partially exposed on the side of the seat and/or on the backside of the seat as to allow the admission of air into the air-conducting layer. This modification is preferred if no perforations can be provided or are to be provided on the seat surface for aesthetical or material-technical reasons.

It is useful if the gasproof surface layer above the air-conducting layer is permeable to moisture. Thus, sweat or another liquid may enter through the surface layer into the air-conducting layer and can be withdrawn via the airflow through the air-conducting layer and the vent channels.

The vent channels extending between the air-conducting layer and the ventilator may be hollow. A greater stability of the seat may, however be achieved by filling the vent channels with an air-permeable material. For this, the same material as for the air-conducting layer may, for example, be used.

It is conceivable that the lower part of the seat and/or the back part of the seat are each provided with a ventilator and that the vent channels in the corresponding part of the seat are brought together to the respective ventilator. A reduction of the number of the ventilators to one ventilator per seat part has the advantage of a smaller consumption of energy for the ventilation and a smaller noise development.

It is even better if the vent channels of the entire seat, i.e. from the lower part of the seat and from the upper part of the seat, are brought together to one common ventilator, since this renders the consumption of energy and the noise development even smaller.

If the ventilation system comprises a heating element and if the driving direction of the ventilator is reversible, the ventilation system ain the seat according to the invention may also be operation as heating. The direction of the airflow is thereby reversed. This operating mode, too, offers the advantage that a flat airflow is achieved along the entire contact surface between the passenger and the seat. (See, FIG. 4 and FIG. 5.)

BRIEF DESCRIPTION OF THE DRAWINGS

Two embodiments of the invention will hereinafter be explained by means of a drawing, wherein.

DETAILED DESCRIPTION OF THE PREFERRED EMBODIMENT

Figure 1:
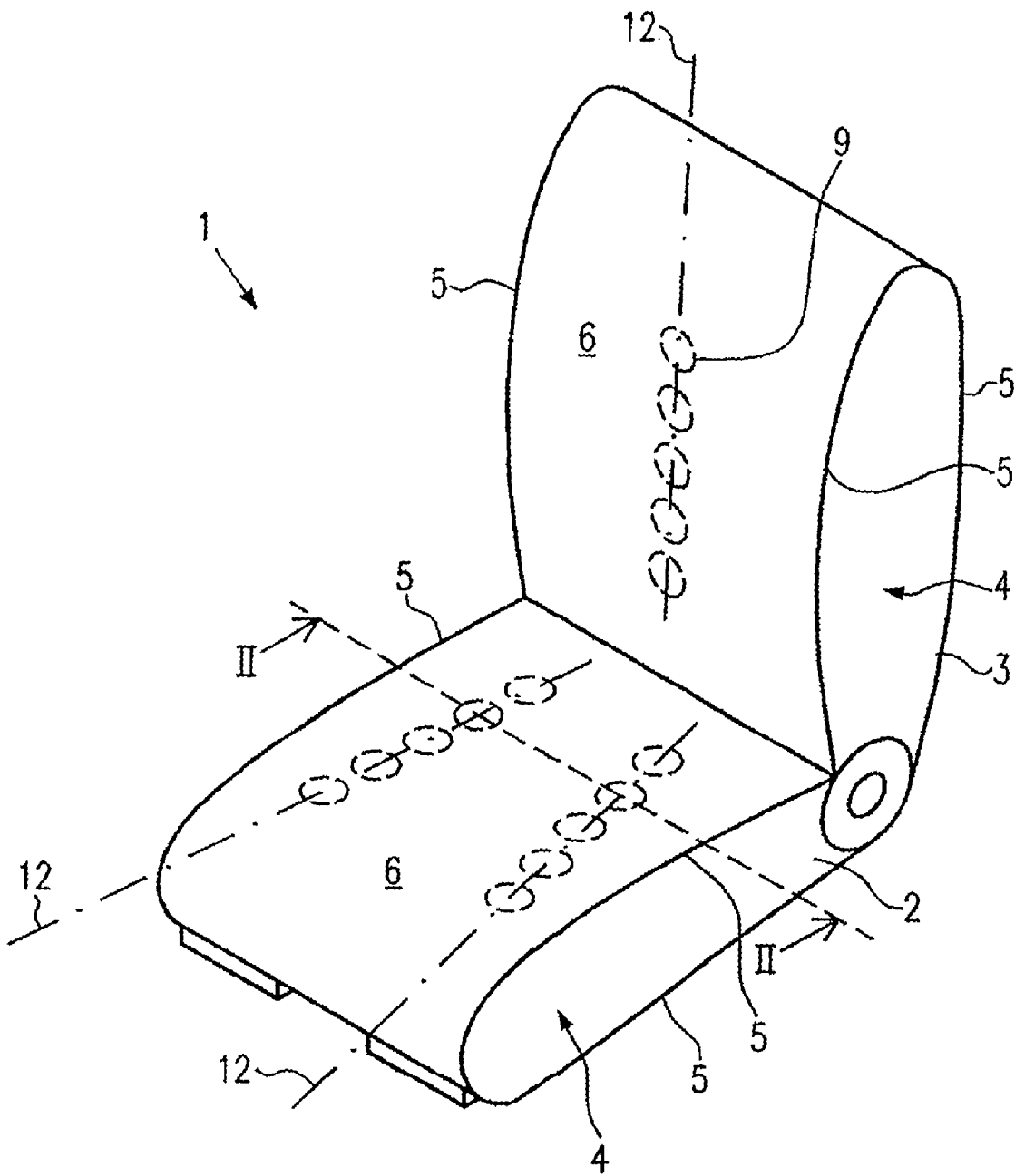
FIG. 1 shows a perspective view of a vehicle seat according to the invention.

FIG. 1 shows a vehicle seat 1 according to the invention which comprises a lower part of the seat 2 and a back part of the seat 3 (back rest). This may be the seat 1 of the driver. A ventilation system 4 is installed in the vehicle seat which serves the cooling of the passenger. The ventilation system 4 is shown in FIGS. 2 and 3 in more detail.

Figure 2:
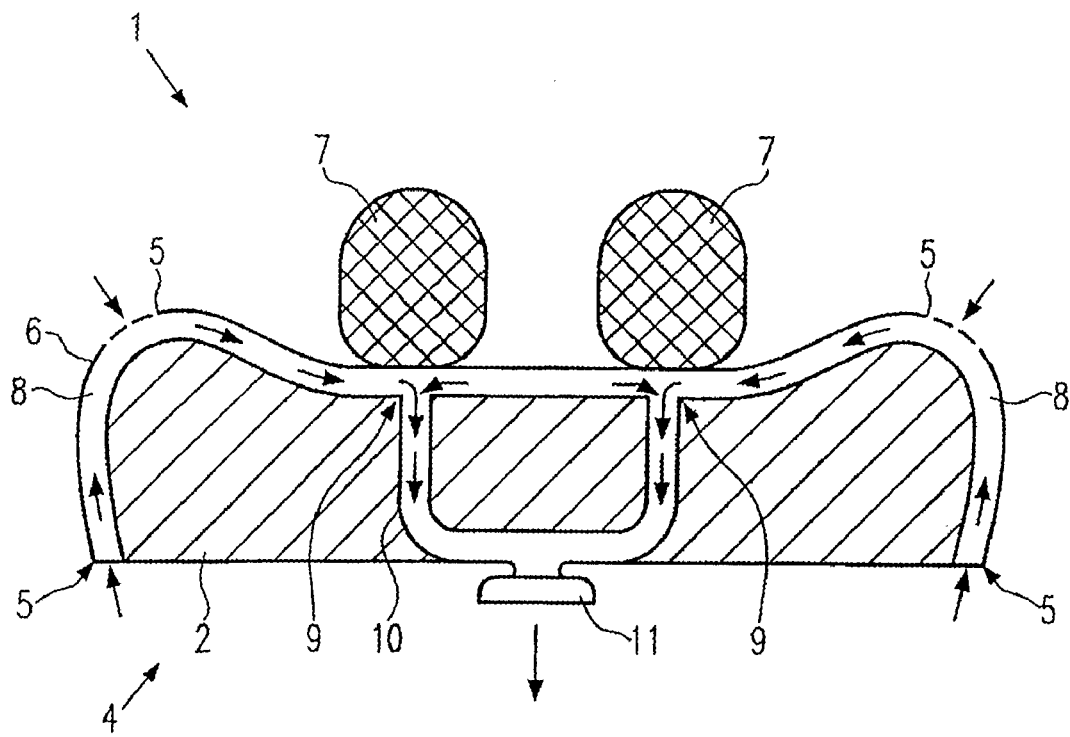
FIG. 2 shows a vertical section through a first modified embodiment of the vehicle seat according to the invention in the plane designated with II-II in FIG. 1.
Figure 3:
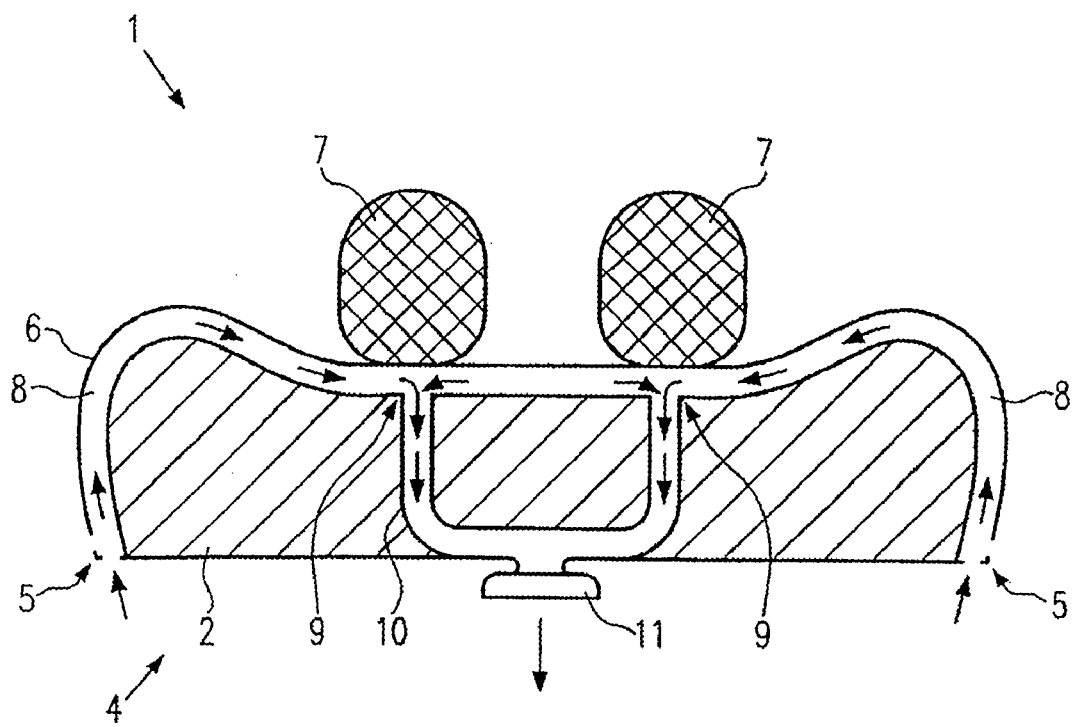
FIG. 3 shows a vertical section through a second modified embodiment of the vehicle seat according to the invention, also in the plane designated with II-II in FIG. 1.
Figure 4:
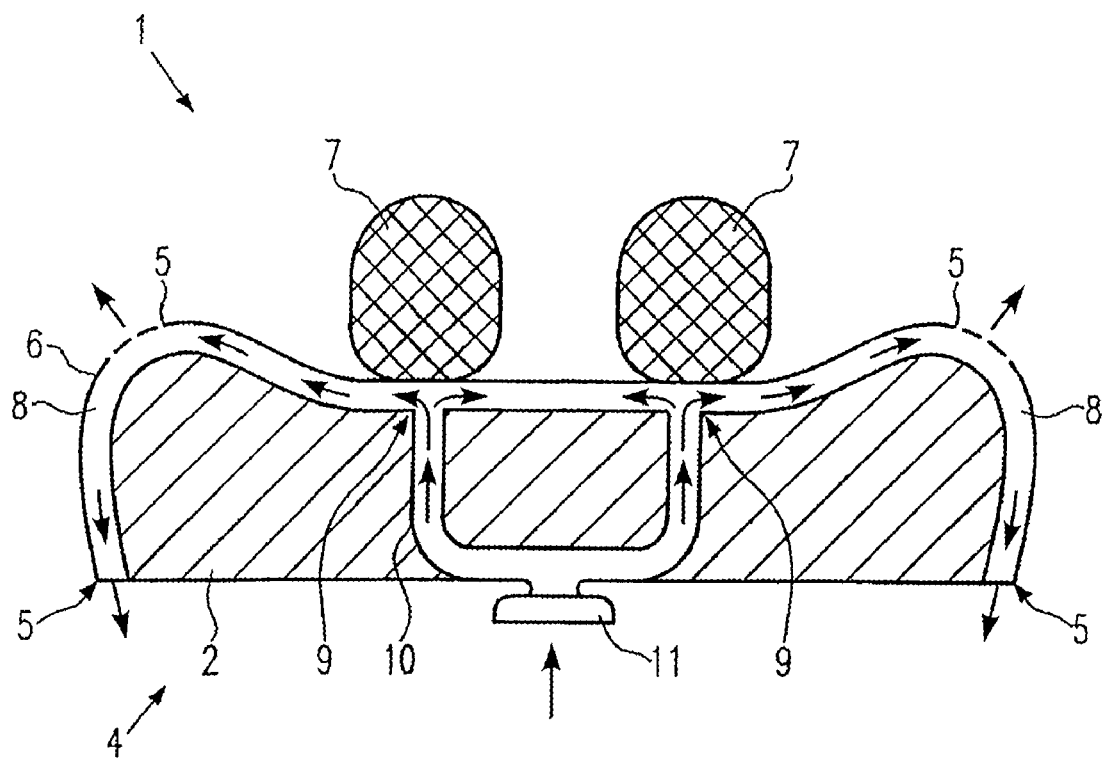
FIG. 4 shows a vertical section through another modified embodiment of the vehicle seat according to the invention in the plane designated with II-II in FIG. 1.
Figure 5:
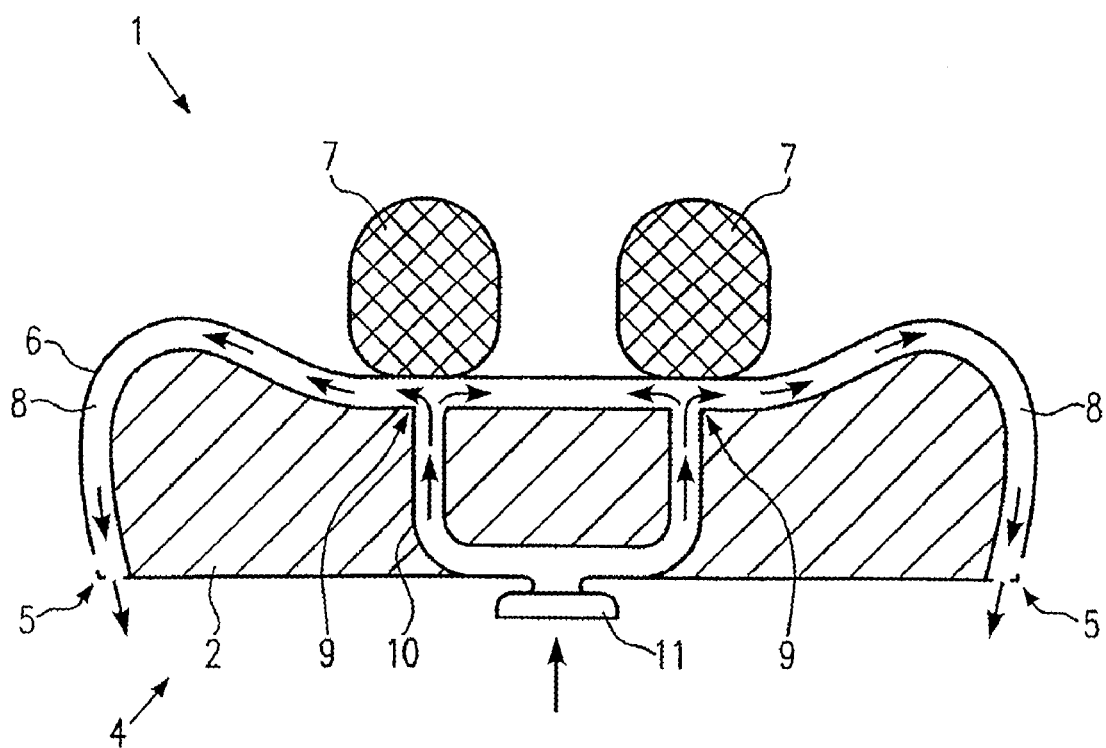
FIG. 5 shows a vertical section through still another modified embodiment of the vehicle seat according to the invention, also in the plane designated II-II in FIG. 1.

FIG. 2 shows the ventilation system 4 in a cross-section through the lower part of the seat 2. On the seat surface the seat 1 is provided with a mainly gasproof, but moisture-permeable surface layer 6. Gasproof leather, imitation leather and woven textiles, for example, are suited as material for the surface layer 6. Inlets, e.g. perforations 5, may be provided on the sides of the seat surfaces 6 and on the edges of the lower part of the seat and the back part of the seat. Two legs 7 of a passenger sitting on seat 1 are indicated by way of example.

An air-conducting layer 8 is provided underneath the surface layer 6. The air-conducting layer 8, which extends over the entire surface of the lower part of the seat 2, is made of a mainly slightly compressible material. This material includes sufficient voids to allow a flow of air. Examples for suited materials for the air-conducting layer 8 are foam having a closed cell structure, foam having an open cell structure, a bonded fabric, especially a polyester fleece, a spacer fabric or a woolen insert.

Vent channels 10 start at the intake spots 9 at the air-conducting layer 8, which vent channels extend from the intake spots vertically to the air-conducting layer through the seat 1. Two vent channels 10 can be seen in FIG. 2. They are brought together above a ventilator 11 on the underside of the seat. The ventilator 11 allows the venting of the vent channels 10 on the underside of seat 1.

FIG. 1 shows the inventive arrangement of the intake spots 9. They are arranged on lines 12 which correspond to the contact lines between the passenger and the seat. In the lower part of the seat 2 the intake spots 9 are placed on two lines 12 diverging forward in the direction of travel and thus corresponding approximately to the expected position of the legs of the passenger on seat 1. In the exemplary embodiment as shown four intake spots 9 are distributed on each of the lines 12 in the lower part of the seat 2.

In the back part of the seat 3 the intake spots are placed on one single line 12 which corresponds approximately to the position of the spine of the passenger on seat 1. Line 12 is therefore formed as a straight line in the center of the seat. Five intake spots 9 are distributed on this straight line 12.

If the ventilator 11 is turned on for cooling the seat 1 and the passenger, an airflow illustrated by arrows in FIG. 2 is built up in the ventilation system 4. Fresh air is sucked into the air-conducting layer from the passenger compartment through the perforations 5 in the surface layer 6. A flat airflow is formed in the air-conducting layer 8. This airflow is passed until directly underneath the body parts 7 of the passenger contacting the seat, as the intake spots 9 are arranged directly underneath these body parts 7. Therefore, a flat airflow is formed on both sides of the body parts 7, which results in a very efficient cooling.

Underneath the body parts 7 the air is sucked off through the intake spots 9 and the vent channels 10. Through the ventilator 11 the air is finally conveyed back to the passenger compartment. As the surface layer 6 is permeable to moisture, also moisture, e.g. sweat, may be withdrawn with the airflow from the passenger to the underside of the seat.

FIG. 3 shows a second modified embodiment of a seat 1 according to the invention comprising a ventilation system 4. According to this modification the surface layer 6 of seat 1 does not have a perforation on the sides of the seat. Instead, the air-conducting layer 8 is passed around the seat to the underside of the seat and ends on the underside of the seat in inlets 5. During the operation of the ventilation system 4 air is sucked in through the exposed end of the air layer 8.

The intake spots 9 shown in the back part of the seat 3 of FIG. 1 analogously lead to the vent channels 10. These vent channels 10 in the back part of the seat 3 may be brought together according to FIGS. 2 and 3 so as to lead to a common ventilator. This ventilator for the back part of the seat 3 may likewise be disposed on the underside of the seat, as a ventilator on the backside of the seat could be inconvenient for passengers sitting behind the seat. Even further the ventilation system 4 could be facilitated by bringing the vent channels 10 from the back part of the seat 3 together with those from the lower part of the seat 2 to a common ventilator 11.

On the basis of the exemplary embodiments as illustrated the vehicle seat according to the invention may be modified in many ways. For example, more or fewer intake spots than the four or five ones shown in FIG. 1 may be provided on lines 12. It is also possible to waive an additional surface layer 6 if the function thereof to provide an attractive visible surface can also be accomplished by the air-conducting layer 8. It would moreover be conceivable to provide the ventilation system 4 of the inventive vehicle seat not on a single seat, but on a bench seat, e.g. on a rear bench of a vehicle. In this case the intake spots 9 would be provided along corresponding contact lines 12 at each seat.

Another modification may reside in that the seat surface is intentionally punctured not only on the sides of the lower part of the seat and the back part of the seat, but also on the surface of the seat and the back rest in order to partially achieve a suction effect, for example, in the portion of the lines of the intake spots. In how far such additional inlets are provided depends on whether one wishes to combine the actually desired flat through-flushing of the seat and back rest body with additional airflows, e.g. to effect especially at or beside the support areas for the legs and the back of the person an additional suction and, to a certain extent, to additionally create turbulent flows. In accordance therewith also the gasproofness of the material of the seat surface may be varied, depending on the extent to which the mixing of the flat through-flow of the seat and back rest body with a turbulent admission flow of additional air is desired.

The invention claimed is:

1. A ventilated vehicle seat comprising:
a seat surface layer having an air-impermeable section arranged adjacent to a seat occupant in a normal seated position, at least a portion of the air-impermeable section provided for contact with the seat occupant in the normal seated position, the seat surface layer having at least one air portal provided in a section of the seat surface layer different than the air-impermeable section of the seat surface layer;
a seat portion positioned beneath the seat surface layer, the seat portion having at least one air portal provided in a surface thereof, the at least one air portal communicating with an air channel provided in the seat portion; and
an air-conducting layer comprising an air-permeable material, the air-conducting layer positioned between the seat surface layer and the seat portion and provided in communication with the at least one air portal in the seat portion and with the at least one air portal in the seat surface layer, the air-conducting layer having a section substantially coextensive with the air-impermeable section of the seat surface layer;
wherein air is directed through the air channel and air portal of the seat portion, and substantially entirely throughout the section of the air-conducting layer substantially coextensive with the air-impermeable section of the seat surface layer to provide a wide-area airflow through the air-conducting layer beneath the air-impermeable section of the seat surface layer adjacent to the seat occupant to facilitate conductive heat transfer among the airflow, the seat surface layer and the seat occupant without direct contact between the airflow and the seat occupant.

2. The ventilated vehicle seat of claim 1 wherein the at least one air portal in the surface of the seat portion comprises a plurality of air portals provided at locations in the surface of the seat portion substantially beneath the air-impermeable section of the seat surface layer.

3. The ventilated vehicle seat of claim 1 wherein the seat portion comprises an upper seat portion, and the at least one air portal provided in the surface of the seat portion comprises a plurality of air portals arranged in the surface of the seat portion along a line substantially parallel to a line on the seat surface layer substantially adjacent to the spine of the seat occupant in the normal seated position.

4. The ventilated vehicle seat of claim 1 wherein the seat portion comprises a lower seat portion, and the at least one air portal provided in the surface of the seat portion comprises a plurality of air portals arranged in the surface of the seat portion along a pair of lines substantially parallel to a pair of lines on the seat surface layer substantially adjacent to the legs of the seat occupant in the normal seated position.

5. The ventilated vehicle seat of claim 1 wherein the airflow comprises air directed through the air-conducting layer to the at least one air portal and the air channel for use in providing cooling to the seat occupant.

6. The ventilated vehicle seat of claim 1 wherein the air-impermeable section of the seat surface layer comprises a moisture permeable material.

7. The ventilated vehicle seat of claim 1 wherein the at least one air portal provided in the seat surface layer is located at one of an edge of the seat portion, a side of the seat portion, and a back of the seat portion.

8. The ventilated vehicle seat of claim 1 wherein the air-conducting layer comprises a non-compressible or only slightly compressible material.

9. The ventilated vehicle seat of claim 1 wherein the airflow comprises air directed from the air channel to the at least on air portal in the seat portion and through the air-conducting layer.

10. The ventilated vehicle seat of claim 9 wherein the airflow comprises heated air for use in providing heating to the seat occupant.

11. A ventilated vehicle seat comprising:
a seat surface layer having an air-impermeable section arranged adjacent to a seat occupant in a normal seated position, at least a portion of the air-impermeable section provided for contact with the seat occupant in the normal seated position, the air-impermeable section comprising a moisture permeable material, the seat surface layer having at least one air portal provided in a section of the seat surface layer different than the air-impermeable section of the seat surface layer;
a seat portion positioned beneath the seat surface layer, the seat portion having at least one air portal provided in a surface thereof at a location substantially beneath the air-impermeable section of the seat surface layer, the at least one air portal communicating with an air channel provided in the seat portion; and
an air-conducting layer comprising an air-permeable material, the air-conducting layer positioned between the seat surface layer and the seat portion and provided in communication with the at least one air portal in the seat portion and with the at least one air portal in the seat surface layer, the air-conducting layer having a section substantially coextensive with the air-impermeable section of the seat surface layer;
wherein air is directed through the air channel and air portal of the seat portion, and substantially entirely throughout the section of the air-conducting layer substantially coextensive with the air-impermeable section of the seat surface layer to provide a wide-area airflow through the air-conducting layer beneath the air-impermeable section of the seat surface layer adjacent to the seat occupant to facilitate conductive heat transfer among the airflow, the seat surface layer and the seat occupant without direct contact between the airflow and the seat occupant.

12. The ventilated vehicle seat of claim 11 wherein the seat portion comprises an upper seat portion, and the at least one air portal provided in the surface of the seat portion comprises a plurality of air portals arranged on the surface of the seat portion along a line substantially parallel to a line on the seat surface layer substantially adjacent to the position of the spine of the seat occupant in the normal seated position.

13. The ventilated vehicle seat of claim 11 wherein the seat portion comprises a lower seat portion, and the at least one air portal provided in the surface of the seat portion comprises a plurality of air portals arranged on the surface of the seat portion along a pair of lines substantially parallel to a pair of lines on the seat surface layer substantially adjacent to the positions of the legs of the seat occupant in the normal seated position.

14. The ventilated vehicle seat of claim 11 wherein the airflow comprises air directed through the air-conducting layer to the at least one air portal and the air channel for use in providing cooling to the seat occupant.

15. The ventilated vehicle seat of claim 11 wherein the at least one air portal provided in the seat surface layer is located at one of an edge of the seat portion, a side of the seat portion, and a back of the seat portion.

16. The ventilated vehicle seat of claim 11 wherein the air-conducting layer comprises a non-compressible or only slightly compressible material.

17. The ventilated vehicle seat of claim 11 wherein the airflow comprises air directed from the air channel to the at least on air portal in the seat portion and through the air-conducting layer.

18. The ventilated vehicle seat of claim 17 wherein the airflow comprises heated air for use in providing heating to the seat occupant.

* * * * *

UNITED STATES PATENT AND TRADEMARK OFFICE
CERTIFICATE OF CORRECTION

| | | |
|---|---|---|
| PATENT NO. | : 7,837,270 B2 | Page 1 of 1 |
| APPLICATION NO. | : 11/096199 | |
| DATED | : November 23, 2010 | |
| INVENTOR(S) | : Harry Eriksson | |

It is certified that error appears in the above-identified patent and that said Letters Patent is hereby corrected as shown below:

Column 6, Line 2, Claim 9:

After "at least" delete "on" and insert -- one --.

Signed and Sealed this
Twenty-ninth Day of March, 2011

David J. Kappos
*Director of the United States Patent and Trademark Office*